(12) United States Patent  (10) Patent No.: US 7,357,439 B1
Morin  (45) Date of Patent: Apr. 15, 2008

(54) WIDESCREEN MOUNTING SYSTEM

(76) Inventor: Armand J. Morin, 6 Wallace St., Methuen, MA (US) 01844

( * ) Notice: Subject to any disclaimer, the term of this patent is extended or adjusted under 35 U.S.C. 154(b) by 0 days.

(21) Appl. No.: 11/533,589

(22) Filed: Sep. 20, 2006

(51) Int. Cl.
*B62J 17/00* (2006.01)

(52) U.S. Cl. .................................... 296/78.1

(58) Field of Classification Search .............. 296/78.1, 296/77.1, 84.1, 180.1, 91
See application file for complete search history.

(56) References Cited

U.S. PATENT DOCUMENTS

| | | | | |
|---|---|---|---|---|
| 2,675,266 | A * | 4/1954 | Comiskey, Sr. ............. | 296/78.1 |
| 2,903,297 | A * | 9/1959 | Zbikowski .................. | 296/78.1 |
| 4,066,291 | A * | 1/1978 | Hickman .................... | 296/78.1 |
| 4,082,345 | A | 4/1978 | Willey | |
| 4,087,110 | A * | 5/1978 | Vetter ........................ | 296/78.1 |
| 4,089,556 | A * | 5/1978 | Stobar ........................ | 296/78.1 |
| 4,226,463 | A | 10/1980 | Gager, Jr. | |
| 4,355,838 | A * | 10/1982 | Hickman .................... | 296/78.1 |
| D285,428 | S | 9/1986 | Cline | |
| 5,732,965 | A * | 3/1998 | Willey ..................... | 280/288.4 |
| 5,788,313 | A * | 8/1998 | Willey ....................... | 296/78.1 |
| 5,845,955 | A * | 12/1998 | Willey ....................... | 296/78.1 |
| 5,857,727 | A * | 1/1999 | Vetter ........................ | 296/78.1 |
| 5,997,070 | A * | 12/1999 | Matsuo et al. ............. | 296/78.1 |
| 6,120,083 | A * | 9/2000 | Gunther ..................... | 296/78.1 |
| 6,196,614 | B1 * | 3/2001 | Willey ........................ | 296/78.1 |
| 6,234,554 | B1 * | 5/2001 | Willey ........................ | 296/78.1 |
| 6,254,166 | B1 * | 7/2001 | Willey ........................ | 296/78.1 |
| 6,505,877 | B1 * | 1/2003 | Devlin et al. .............. | 296/78.1 |
| 6,543,831 | B2 * | 4/2003 | Takemura et al. ......... | 296/78.1 |
| 6,736,441 | B1 * | 5/2004 | Barber et al. ............ | 296/96.21 |
| 6,789,835 | B2 | 9/2004 | Wargin et al. | |
| 6,808,219 | B2 * | 10/2004 | Barber et al. .............. | 296/78.1 |
| 6,877,788 | B2 * | 4/2005 | Graham ..................... | 296/78.1 |
| 6,905,160 | B2 * | 6/2005 | Yoshida et al. ............ | 296/78.1 |
| 7,090,280 | B2 * | 8/2006 | Willey ........................ | 296/78.1 |
| 7,104,585 | B2 * | 9/2006 | Miura et al. ............... | 296/78.1 |
| 7,178,858 | B1 * | 2/2007 | Hesse ....................... | 296/180.1 |
| 2005/0161970 | A1 * | 7/2005 | Willey ........................ | 296/78.1 |
| 2007/0040407 | A1 * | 2/2007 | Salisbury ................... | 296/78.1 |

* cited by examiner

*Primary Examiner*—Kiran B. Patel

(57) ABSTRACT

A windscreen mounting system for mounting a windscreen to a motorcycle includes a windscreen being configured to engage and match the contours of a fairing of a motorcycle. The windscreen deflects air passing over the fairing upwardly and over a rider of the motorcycle to reduce drag while the motorcycle is traveling across a surface. A first mounting bracket is abutted against the fairing opposite the windscreen. A second mounting bracket is abutted against the windscreen opposite the fairing. Each of a plurality of fasteners engages the first mounting bracket and the second mounting bracket to secure the first mounting bracket, the second mounting bracket and the windscreen to the fairing.

7 Claims, 3 Drawing Sheets

WIDESCREEN MOUNTING SYSTEM

BACKGROUND OF THE INVENTION

1. Field of the Invention

The present invention relates to windshield mounting devices and more particularly pertains to a new windshield mounting device for mounting a windscreen to a motorcycle.

2. Description of the Prior Art

The use of windshield mounting devices is known in the prior art. The prior art commonly teaches a plurality of plates being mounted to a motorcycle and a bracket to mount the windshield to the motorcycle. While these devices fulfill their respective, particular objectives and requirements, the need remains for a system that has certain improved features that allows for mounting brackets to secure a windscreen to a fairing and be viewed through a portion of one of the mounting brackets. Additionally, the system includes a trim plate to cover a portion of fasteners to improve the appearance of the system.

SUMMARY OF THE INVENTION

The present invention meets the needs presented above by generally comprising a windscreen being configured to engage and match the contours of a fairing of a motorcycle. The windscreen deflects air passing over the fairing upwardly and over a rider of the motorcycle to reduce drag while the motorcycle is traveling across a surface. A first mounting bracket is abutted against the fairing opposite the windscreen. A second mounting bracket is abutted against the windscreen opposite the fairing. Each of a plurality of fasteners engages the first mounting bracket and the second mounting bracket to secure the first mounting bracket, the second mounting bracket and the windscreen to the fairing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
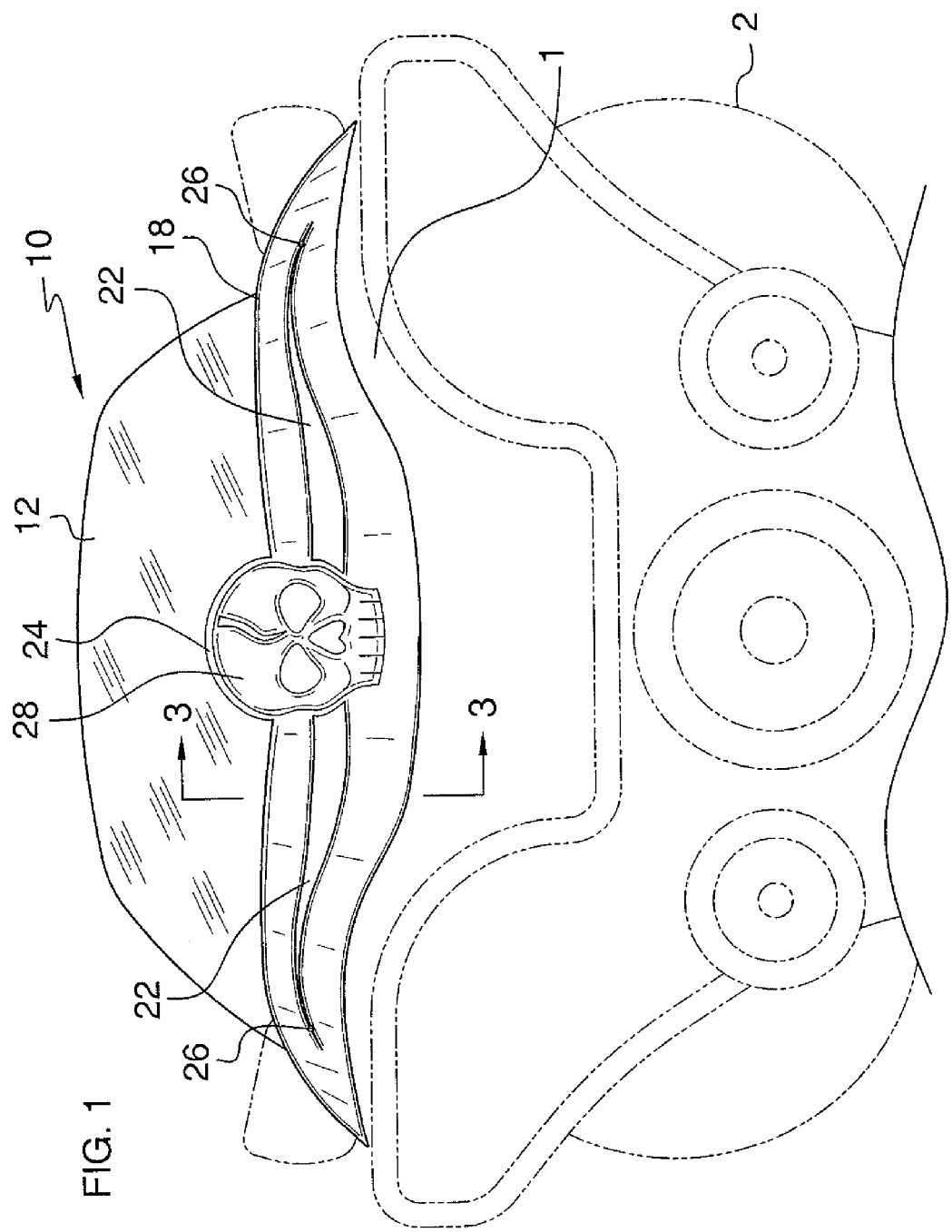
FIG. 1 is a front view of a windscreen mounting system according to the present invention.
Figure 2:
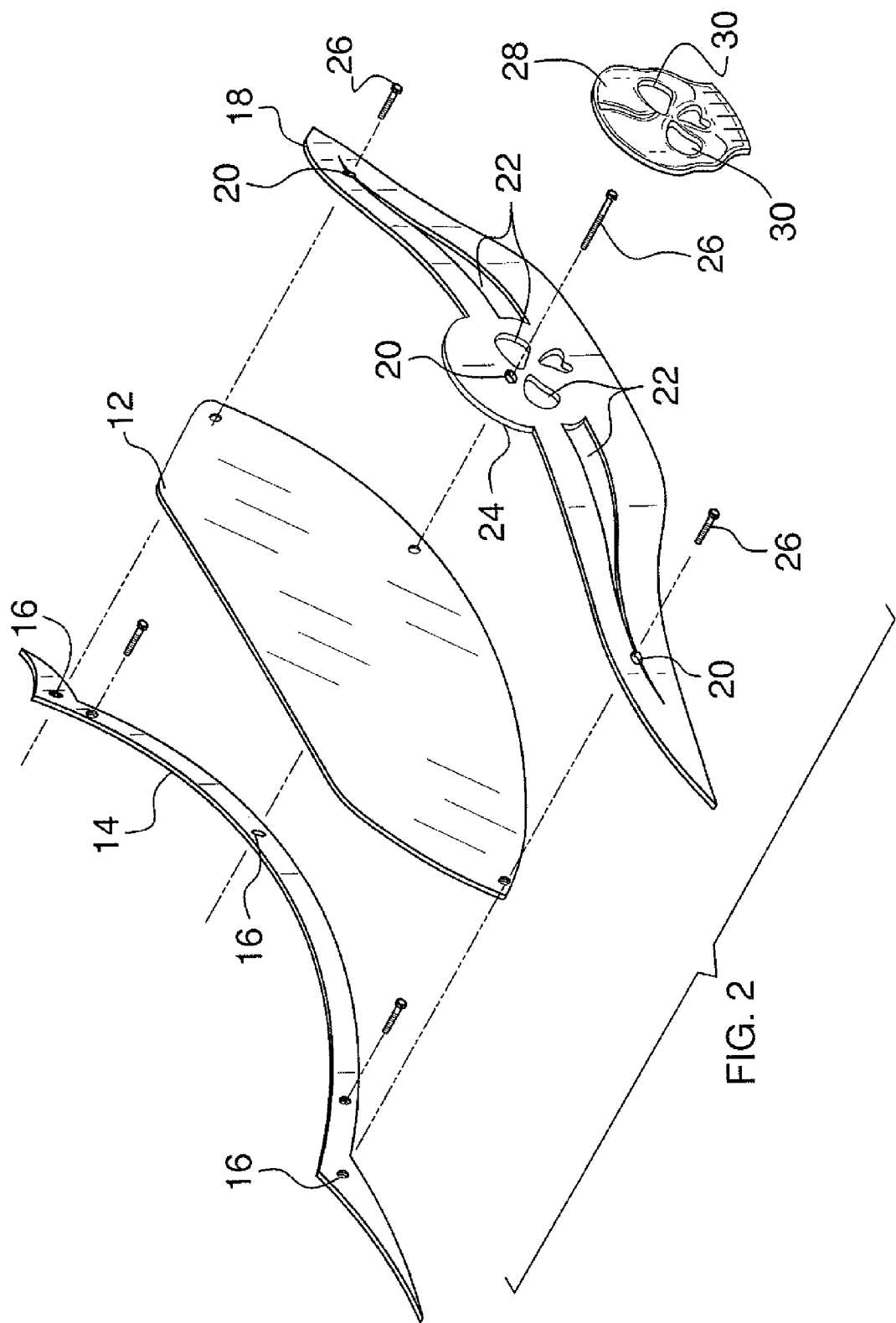
FIG. 2 is an exploded perspective view of the present invention.
Figure 3:
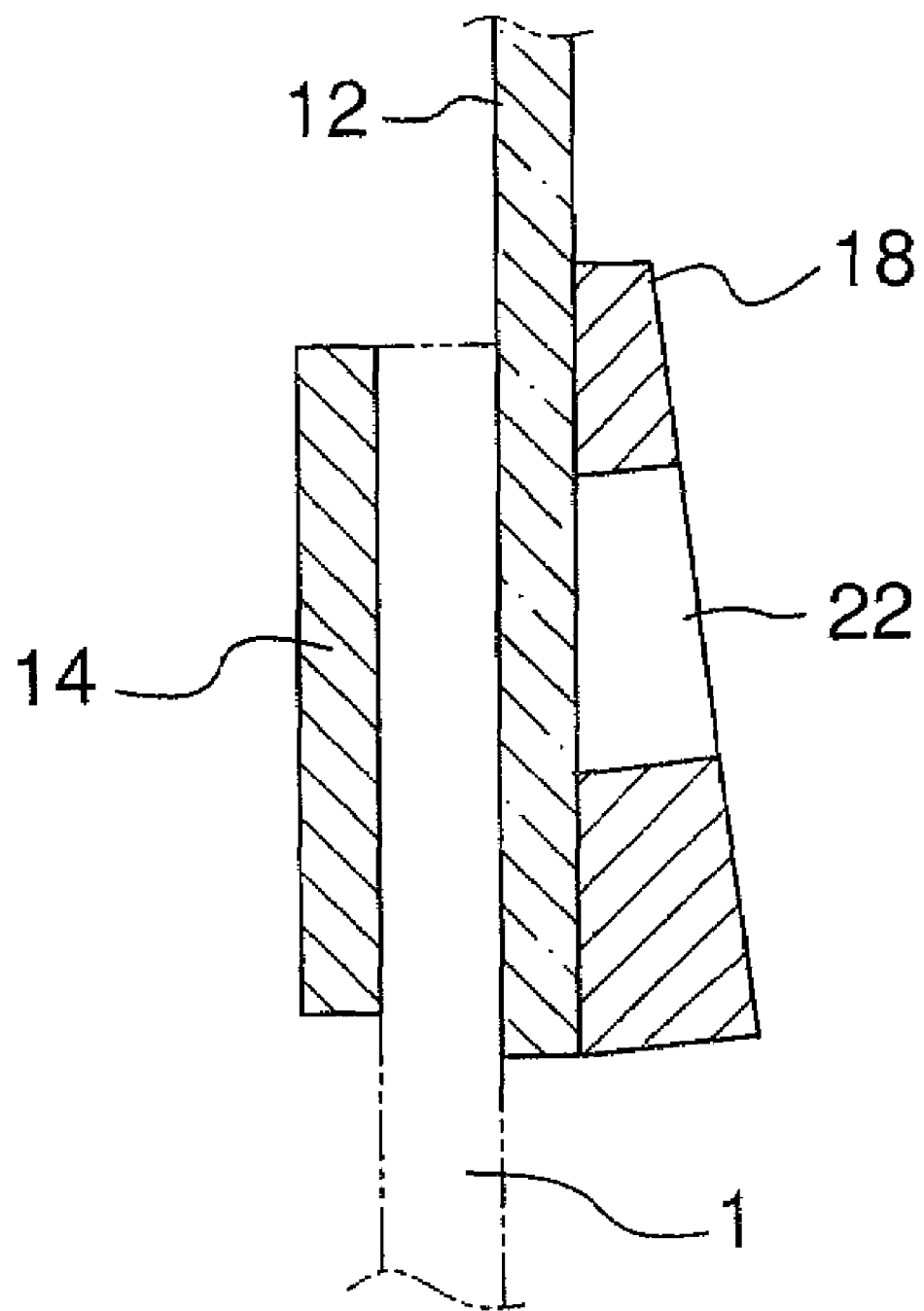
FIG. 3 is a cross-sectional view of the present invention taken along line 3-3 of FIG. 1.

With reference now to the drawings, and in particular to FIGS. 1 through 3 thereof, a new windshield mounting device embodying the principles and concepts of the present invention and generally designated by the reference numeral 10 will be described.

As best illustrated in FIGS. 1 through 3, the windscreen mounting system 10 generally comprises a windscreen 12 being configured to engage and match the contours of a fairing 1 of a motorcycle 2. The windscreen 12 deflects air passing over the fairing 1 upwardly and over a rider of the motorcycle 2 to reduce drag while the motorcycle 2 is traveling across a surface. A first mounting bracket 14 is abutted against the fairing 1 opposite the windscreen 12. The first mounting bracket 14 has a plurality of mounting apertures 16 extending therethrough.

A second mounting bracket 18 is abutted against the windscreen 12 opposite the fairing 1. The second mounting bracket 18 has a plurality of mounting holes 20 extending therethrough. Each of the mounting holes 20 is aligned with one of the mounting apertures 16 of the first mounting bracket 14. The second mounting bracket 18 has a plurality of ornamental cutouts 22 to permit a portion of the windscreen 12 to be viewed through the second mounting member. A medial portion 24 of the second mounting bracket 18 has at least one of the mounting holes 20 extending therethrough. Each of a plurality of fasteners 26 extends through one of the mounting holes 20, the windscreen 12, the fairing 1 and one of the mounting apertures 16 and secured to the first mounting bracket 14. Each of the fasteners 26 secures the first mounting bracket 14 to the second mounting bracket 18 to secure the wind screen to the fairing 1.

A trim plate 28 is mounted to the medial portion 24 of the second mounting bracket 18. The trim plate 28 is positioned over the associated one of the mounting holes 20 to obscure the associated one of the mounting holes 20 and the associated one of the fasteners 26 from view. The trim plate 28 is ornate to enhance the appearance of the fairing 1. The trim plate 28 has a plurality of ornate cutouts 30 extending therethrough. The ornate cutouts 30 are aligned with the ornamental cutouts 22 extending through the medial portion 24 of the second mounting bracket 18 to permit viewing of the windscreen 12 through the medial portion 24 and the trim plate 28.

In use, the first mounting bracket 14 is positioned against the fairing 1 with the windscreen 12 being positioned on the other side of the fairing 1 from the first mounting bracket 14. The second mounting bracket 18 is positioned against the windscreen 12 and the fasteners 26 are extending through the second mounting bracket 18, the windscreen 12 and the fairing 1 and secured to the first mounting bracket 14 to secure the windscreen 12 to the fairing 1. The trim plate 28 is positioned over the medial portion 24 of the second mounting plate to provide decorative element to the second mounting bracket 18.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windscreen mounting system comprising:
   a windscreen being configured to engage and match the contours of a fairing of a motorcycle, said windscreen deflecting air passing over the fairing upwardly and over a rider of the motorcycle to reduce drag while the motorcycle is traveling across a surface;
   a first mounting bracket being abutted against the fairing opposite said windscreen;
   a second mounting bracket being abutted against said windscreen opposite the fairing;
   a plurality of fasteners, each of said fasteners engaging said first mounting bracket and said second mounting bracket to secure said first mounting bracket, said second mounting bracket and said windscreen to the fairing; and
   a trim plate being mounted to a medial portion of said second mounting bracket, said trim plate being positioned over one of said fasteners extending through said medial portion to obscure the associated one of said fasteners from view.

2. The windscreen mounting system according to claim 1, wherein said first mounting bracket has a plurality of mounting apertures extending therethrough.

3. The windscreen mounting system according to claim 2, wherein said second mounting bracket has a plurality of mounting holes extending therethrough, each of said mounting holes being aligned with one of said mounting apertures of said first mounting bracket, each of said fasteners extending through one of said mounting holes, said windscreen, the fairing and one of said mounting apertures and secured to said first mounting bracket to secures said first mounting bracket to said second mounting bracket.

4. The windscreen mounting system according to claim 3, wherein said second mounting bracket includes a medial portion, said medial portion having at least one of said mounting holes extending therethrough.

5. The windscreen mounting system according to claim 1, wherein said second mounting bracket has a plurality of ornamental cutouts to permit a portion of said windscreen to be viewed through said second mounting member.

6. The windscreen mounting system according to claim 5, wherein said trim plate is ornate to enhance the appearance of the fairing, said trim plate having a plurality of ornate cutouts extending therethrough, said ornate cutouts being aligned with said ornamental cutouts extending through said medial portion of said second mounting bracket to permit viewing of said windscreen through said medial portion and said trim plate.

7. A windscreen mounting system comprising:
   a windscreen being configured to engage and match the contours of a fairing of a motorcycle, said windscreen deflecting air passing over the fairing upwardly and over a rider of the motorcycle to reduce drag while the motorcycle is traveling across a surface;
   a first mounting bracket being abutted against the fairing opposite said windscreen, said first mounting bracket having a plurality of mounting apertures extending therethrough;
   a second mounting bracket being abutted against said windscreen opposite the fairing, said second mounting bracket having a plurality of mounting holes extending therethrough, each of said mounting holes being aligned with one of said mounting apertures of said first mounting bracket, said second mounting bracket having a plurality of ornamental cutouts to permit a portion of said windscreen to be viewed through said second mounting member, a medial portion of said second mounting bracket having at least one of said mounting holes extending therethrough;
   a plurality of fasteners, each of said fasteners extending through one of said mounting holes, said windscreen, the fairing and one of said mounting apertures and secured to said first mounting bracket, each of said fasteners securing said first mounting bracket to said second mounting bracket to secure said wind screen to the fairing; and
   a trim plate being mounted to said medial portion of said second mounting bracket, said trim plate being positioned over the associated one of said mounting holes to obscure the associated one of said mounting holes and the associated one of said fasteners from view, said trim plate being ornate to enhance the appearance of the fairing, said trim plate having a plurality of ornate cutouts extending therethrough, said ornate cutouts being aligned with said ornamental cutouts extending through said medial portion of said second mounting bracket to permit viewing of said windscreen through said medial portion and said trim plate.

* * * * *